United States Patent
Kopp et al.

(10) Patent No.: US 8,457,456 B2
(45) Date of Patent: Jun. 4, 2013

(54) OPTICAL FIBER MODE COUPLING DEVICE, HAVING AN OPTIMIZED FIBER INTERFACE AND METHOD OF FABRICATION THEREOF

(75) Inventors: Victor Il'ich Kopp, Fair Lawn, NJ (US); Jonathan Singer, New Hope, PA (US); Victor M. Churikov, Wyckoff, NJ (US); Christopher W. Draper, Allendale, NJ (US); Norman Chao, Brooklyn, NY (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 667 days.

(21) Appl. No.: 12/254,758

(22) Filed: Oct. 20, 2008

(65) Prior Publication Data

US 2009/0136176 A1 May 28, 2009

Related U.S. Application Data

(60) Provisional application No. 60/981,180, filed on Oct. 19, 2007.

(51) Int. Cl.
*G02B 6/26* (2006.01)

(52) U.S. Cl.
USPC .................... 385/29; 385/11; 385/43; 385/50

(58) Field of Classification Search
USPC .............................. 385/11, 27–29, 43, 50, 127
See application file for complete search history.

(56) References Cited

U.S. PATENT DOCUMENTS 6,321,005 B1 * 11/2001 Satorius ........................ 385/28

* cited by examiner

*Primary Examiner* — Uyen Chau N Le
*Assistant Examiner* — Michael Mooney
(74) *Attorney, Agent, or Firm* — Edward Etkin, Esq.

(57) ABSTRACT

An optical fiber mode coupling device, capable of being readily connected to a conventional optical fiber with a high degree of ruggedness, is provided. The inventive mode coupling device only allows transmission of at least one supported fiber mode therethrough, and is preferably configured to maximize the coupling, of at least one desired fiber mode, to the at least one supported fiber mode. Advantageously, the inventive mode coupling device is capable of performing the functions of a mode filter for the signal entering its first end, or serving as a mode conditioner for the signal entering its opposite second end. Thus, in one practical application thereof, the novel mode coupling device functions as a mode filter by maximizing the coupling between at least one desired fiber mode of a multi-mode input signal entering the device's first end, and at least one supported mode of the device, to produce an output signal at the device's second end that comprises at least one predetermined fiber mode, corresponding to at least one desired fiber mode. In another practical application thereof, the novel mode coupling device functions as a mode conditioner by maximizing the coupling between an input signal, comprising at least one predetermined fiber mode, that enters the device's second end, and, and at least one supported mode of the device, to produce an output signal at the device's first end that comprises at least one desired fiber mode, corresponding to a conditioned at least one predetermined fiber mode.

12 Claims, 4 Drawing Sheets

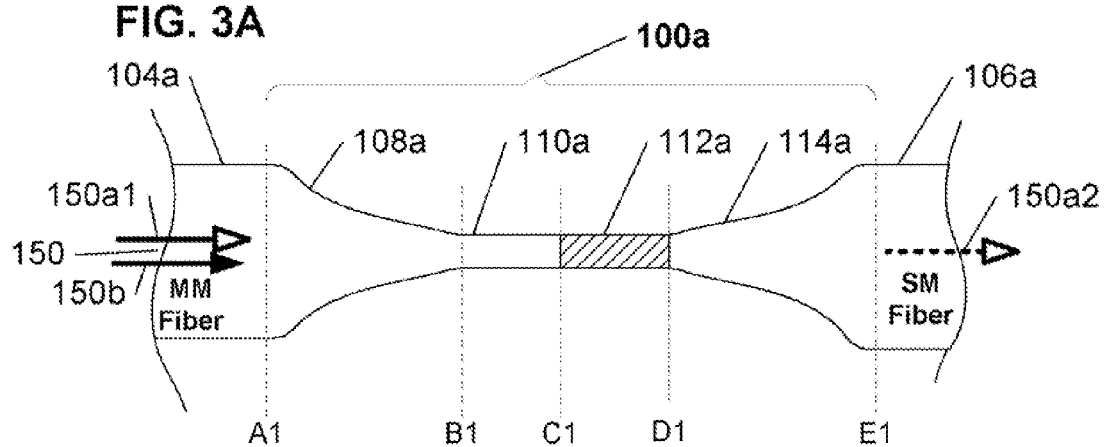
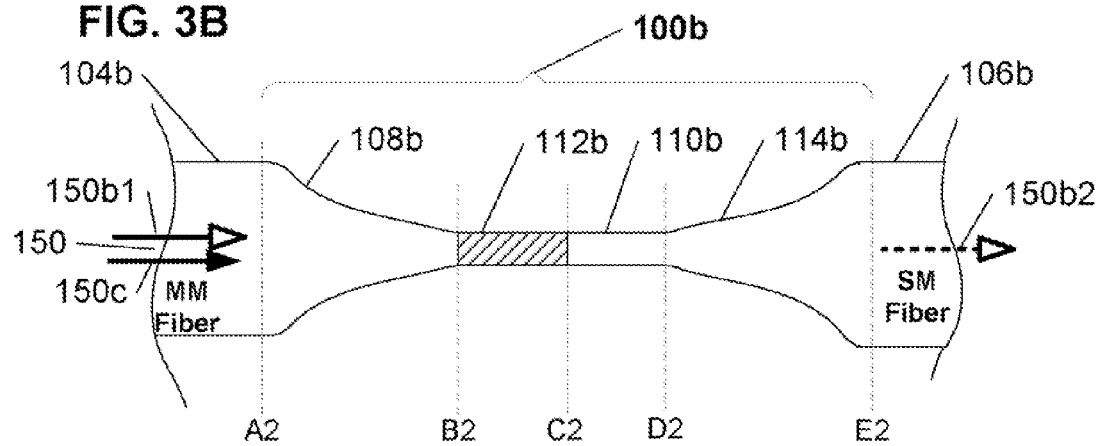

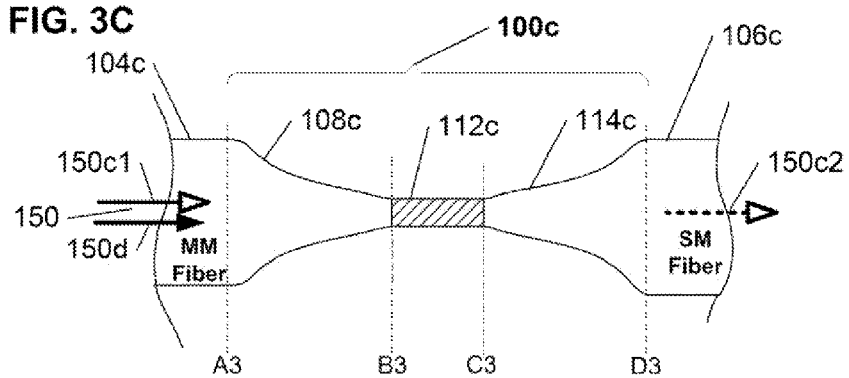
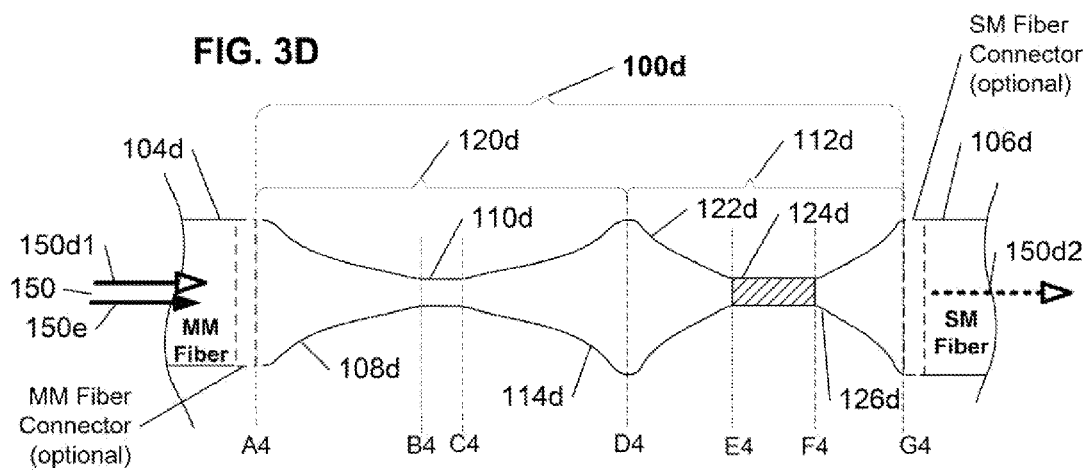

OPTICAL FIBER MODE COUPLING DEVICE, HAVING AN OPTIMIZED FIBER INTERFACE AND METHOD OF FABRICATION THEREOF

FIELD OF THE INVENTION

The present invention relates generally to mode coupling devices, and more particularly to an in-fiber optical fiber mode coupling device that only permits coupling of at least one supported fiber mode with only at least one desired fiber mode, that is configured to maximize that coupling, and that is capable of connection to a conventional optical fiber with sufficient ruggedness to enable commercial/industrial utilization thereof without additional external coupling components.

BACKGROUND OF THE INVENTION

Mode filter devices (hereinafter "mode filters") are in common use in many modern digital communication systems that utilize optical fibers for data transmission. At the most basic level, a typical digital communication system that utilizes multimode fibers, includes a transmitter for transmitting an optical signal over a multimode fiber connected thereto, and also includes at least one receiver, each for receiving an optical signal of at least one specific desired fiber mode. In order to ensure that the receiver only receives the at least one desired fiber mode, at least one mode filter, each capable of passing at least one desired fiber mode to the receiver, is employed between the multimode fiber and the receiver.

Traditionally, high data bitrate communications were handled with the use of electronic dispersion compensators (EDCs). This approach suffered from a number of drawbacks. First the EDCs are relatively bulky and thus take up valuable space in digital communication system components. Second, such devices require electrical power and fail if the power ceases to be supplied. Third, EDC are relatively expensive. Finally, like all electronic devices such EDCs share the susceptibility to failure from a variety of factors (circuit failure, overheating, electrical surges, physical disturbance, etc.)

To address the above issues, one solution has been proposed in U.S. patent application Ser. No.: 11/524,857, of Deliwala, entitled "High Bitrate Transport Over Multimode Fibers" (hereinafter, the "'857 application"). Specifically, the '857 application disclosed a high bitrate optical signal transport system that utilized at least one substantially in-line "optical fiber-based" mode filter, intended for use between a multimode fiber at one of its ends, and a single mode fiber at its other end, between a transmitter sending an optical signal with many modes over a multimode optical fiber, and a receiver, to ensure that the receiver only receives at least one specific predetermined fiber mode for each mode filter used (See FIGS. 2A, 2B, 3 of '857 application and accompanying descriptions).

As part of the disclosed transport system, the '857 application taught an optical fiber-based mode filter component, shown as a mode filter 2 in FIG. 1 thereof, that, in its primary embodiment comprised, at one end, a multimode fiber taper 8 that is tapered down to a "single mode condition", and then without interruption expanded, as an adiabatic taper 4, to "match the mode of the single mode fiber at output 6." The '857 application further stated that the minimum core radius of the taper 4, is "calculated to achieve the single mode condition for given refractive indices of cladding and core", and further states that, as a result, the output of the taper 4 only transmits the fundamental mode of the multimode fiber. (See FIG. 1 and Paragraphs 17-18 of the '857 application). The '857 application further noted that a single taper 6 could be used without taper 4 with additional supporting components (such as a lens system or on-chip, i.e., electronic, couplers)—however this embodiment is not actually an optical fiber mode filter, because other non-fiber components must be used with all above-described disadvantages thereof.

The '857 application purports to disclose an optical fiber based mode filter 2 (See '857 application FIG. 1) that comprises a two-part adiabatic taper 4 which includes a first taper 4 region at the multimode fiber side I/O 8 (hereinafter, "taper 8"), and second taper 4 region at the single mode fiber side I/O 6 (hereinafter, "taper 6"), respectively.

However, the '857 application mode filter 2, is flawed in several ways. First, the proposed taper-down (taper 8) and then, without interruption taper-up (taper 6) configuration, will not result in sufficient rejection of modes other than the single mode desired within the multimode fiber connected to taper 8. Furthermore, the refractive index contrast between the fiber cladding and the surrounding medium at the taper 8-taper 6 interface, will result in a correspondingly higher number of undesired fiber modes, in addition to the fundamental mode, that would be entering the taper 4, thereby significantly disrupting the operation of the '857 application mode filter 2.

Second, the '857 application clearly states that its adiabatic taper 4 is expanded to "match the mode of the single mode fiber at output 6." Therefore, even without the above-described inability of the '857 application mode filter 2 to effectively isolate and pass substantially only the fundamental mode, following this teaching, in actuality the taper 6 would be expanded to a much smaller size than the diameter of the MMF or the diameter of SMF.

Referring now to FIG. 1B, a representation of the optical fiber mode filter 2 of '857 application FIG. 1 is shown as a mode filter 100, with tapers 104 and 114 corresponding to '857 application mode filter 2 first taper 4 region at the multimode side I/O 8 (i.e., taper 8), and the second taper 4 region at the single mode side I/O 6 (i.e., taper 6), respectively. The multimode fiber section 102 and the single mode fiber section 16', correspond to the multimode and single mode fiber segments shown in FIG. 1 of the '857 application, and labeled "MMF", and "SMF", respectively. As described in greater detail below, the FIG. 1B herein, accurately shows the actual disparity between the cladding diameters of the '857 application taper 6 and a standard or conventional SMF at the interface therebetween.

While FIG. 1 of the '857 application shows the relative core sizes of the MMF and SMF segments as being relatively similar, in reality, there is typically a much greater disparity in their relative core sizes, while the overall fiber diameter (i.e., cladding size) remains generally similar. It is well known, that each fiber mode has its own corresponding mode field diameter ("MFD"), and for a desired fundamental mode, the MFD is most significantly dependent on core diameter. This means that the fundamental mode of the SMF 16' substantially corresponds to its core diameter D3'. Therefore, following the teaching of the '857 application, if the taper 6 thereof (taper 114 in FIG. 1B herein) is expanded to match the MFD of the single mode of the SMF at its output, then the diameter D12 of the taper 114 core 108b at its interface with the SMF 16', is expected to be either equal to, or substantially similar to, the SMF 16' core 40' diameter of D3'.

However, as can be readily seen from the FIG. 1B herein, the actual expansion of the diameter of the taper 114 would be rather small, and even at its end (at position Z), the diameter D11 of the taper 114 cladding 110b, would actually be much smaller than the diameter D4' of the SMF 16'. Such a significant difference between the diameter of the taper at its connecting end, and the optical fiber to which it must be connected, greatly reduces the rigidity and ruggedness of the connection, and thus significantly decreases the mode filter device reliability. Moreover, this arrangement significantly increases the difficulty of centering the mode filter device and the SMF 16' along the same central longitudinal axis.

By way of example, to further illustrate the above-described flaws in the teachings of the '857 application, a typical commonly available MMF has a cladding diameter of about 125 microns and a core diameter of about 62.5 microns, while a standard SMF has a cladding diameter of approximately about 125 microns, and a core diameter of about 8.3 microns. Referring now to FIG. 1B herein, following the teachings of the '857 application, the taper 112 ('857 application Taper 8) would need to be reduced to a very small core 108*a* diameter D9 to reach the diameter that supports only at least one specific mode (i.e., the at least one supported mode)—(ignoring for the moment the above-described reason why an uninterrupted taper-taper interface would not actually isolate the at least one specific fiber mode), and then expanded as taper 114 ('857 application Taper 6) until the taper 114 matched the mode of the SMF 16', which corresponds to expanding the taper 114 until its core 108*b* diameter D12 at its end, substantially matches the SMF core 40' diameter D3'.

However, as can be readily seen from FIG. 1B, expanding from the very small diameter core at position Y, such that the core 108*b* is about 8 microns in diameter D12 at position Z, would result in the diameter D11 of the cladding 110*b* of the taper 114 at position Z being only approx twice the size of the core 108*b* diameter D12 (i.e., approx 16 microns)—nearly $\frac{1}{8}^{th}$ of the diameter of the cladding 42' of the SMF 16' at the interface with the taper 114. And, as noted above, this great disparity in relative diameters D11 of the taper 114 and D4' of the SMF 16', makes the connection of the mode filter 100 to the SMF 16' fragile, and thus unreliable.

It should also be noted that the '857 application teaches and describes filtering of only spatial fiber modes. The '857 application mode filter does not have any effect on polarized fiber modes (as it lacks any structure for isolating and/or filtering polarized modes, and further lacks any teaching or suggestion for doing so). As a result, even if the mode filter of the '857 application were capable of performing its recited functions, it would be limited in effectiveness/performance by its reliance solely on spatial fiber mode filtering.

Furthermore, previously known functional mode filters not capable of effective mode conditioning, for signals entering the filter from the single mode fiber side.

It would thus be desirable to provide an optical fiber mode coupling device that provides a high degree of ruggedness when coupled to a conventional optical fiber. It would also be desirable to provide an optical fiber mode coupling device that is capable of substantially isolating at least one desired fiber mode of the optical signal traveling though its central portion by maximizing coupling between the at least one desired fiber mode, and the device's at least one supported fiber mode. It would further be desirable to provide an optical fiber mode coupling device capable of performing the functions of a mode filter for a signal entering its first end, to produce a mode filtered signal at its second end, or as a mode conditioner for a signal entering its opposite second end, to produce a mode conditioned signal at the first end. It would additionally be desirable to provide an optical fiber mode coupling device capable of superior mode filtering and mode conditioning performance by filtering at least one polarized fiber mode in addition to at least one spatial fiber mode.

SUMMARY OF THE INVENTION

The present invention is directed to a novel optical fiber mode coupling device, capable of being readily connected to a conventional optical fiber with a high degree of ruggedness and reliability. The inventive mode coupling device only allows transmission of at least one supported fiber mode therethrough, and is preferably configured to maximize the coupling, of at least one desired fiber mode, to the at least one supported fiber mode.

Advantageously, the inventive mode coupling device is capable of performing the functions of a mode filter for the signal entering its first end, or serving as a mode conditioner for the signal entering its opposite second end. Thus, in one practical application thereof, the novel mode coupling device functions as a mode filter by maximizing the coupling between at least one desired fiber mode of a multi-mode input signal entering the device's first end, and at least one supported mode of the device, to produce an output signal at the device's second end that comprises at least one predetermined fiber mode, corresponding to at least one desired fiber mode.

In another practical application thereof, the novel mode coupling device functions as a mode conditioner by maximizing the coupling between an input signal, comprising at least one predetermined fiber mode, that enters the device's second end, and, and at least one supported mode of the device, to produce an output signal at the device's first end that comprises at least one desired fiber mode, corresponding to a conditioned at least one predetermined fiber mode.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended Claims.

BRIEF DESCRIPTION OF THE DRAWINGS

In the drawings, wherein like reference characters denote corresponding or similar elements throughout the various figures:

FIGS. 3A-3D are schematic side view diagrams of various exemplary embodiments of the inventive optical fiber mode coupling device that includes a polarizer component operable to filter and/or condition at least one polarized fiber mode, in addition to at least one spatial fiber mode.

DETAILED DESCRIPTION OF THE PREFERRED EMBODIMENTS

Figure 1A:
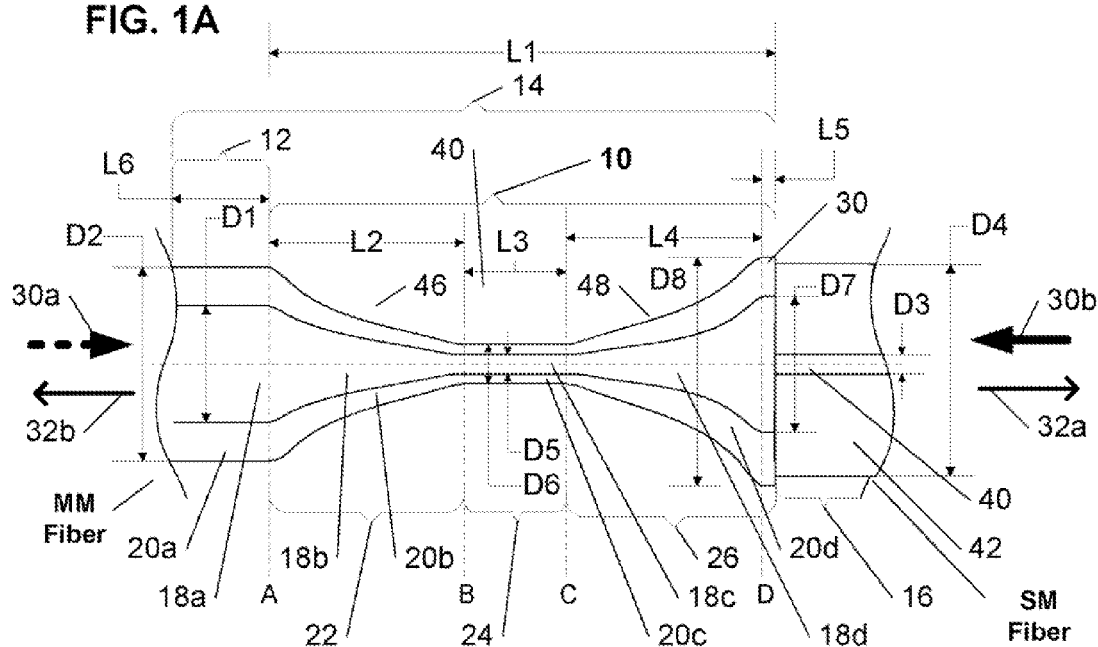
FIG. 1A is a schematic diagram of a side view of a first embodiment of the optical fiber mode coupling device of the present invention, shown, by way of example, in utilization thereof.

The optical fiber mode coupling device of the present invention not only addresses the flaws and shortcomings of previously known mode filters, but is also capable of selectively being utilized for fiber mode conditioning, while advantageously being configured for connection to a conventional optical fiber with a high degree of ruggedness. The inventive mode coupling device substantially only allows coupling of at least one supported fiber mode, and is preferably configured to maximize the coupling with only at least one desired fiber mode.

Advantageously, the inventive mode coupling device is capable of performing the functions of a mode filter for a signal entering its first end from a multimode optical fiber, or serving as a mode conditioner for a signal entering its opposite second end from a single mode optical fiber. Accordingly, in one practical application thereof, the inventive mode coupling device functions as a mode filter by maximizing the coupling between at least one desired fiber mode of a multimode input signal entering the device's first end, and at least one supported mode of the device, to produce an output signal at the device's second end that comprises at least one predetermined fiber mode, corresponding to at least one desired fiber mode.

In another practical application thereof, the novel mode coupling device may be utilized as a mode conditioner which maximizes the coupling between an input signal, that includes at least one predetermined fiber mode and that enters the device's second end, and at least one supported mode of the device, and then conditions the at least one supported mode of the device to maximize coupling to the at least one predetermined fiber mode of the output signal at the device's first end.

In summary, in one exemplary embodiment of the present invention, the inventive optical fiber mode coupling device is implemented as an elongated optical structure that includes: a first taper region, configured for connection to a multimode optical fiber at its first end, that tapers down toward its second end to a sufficient diameter to support only at least one supported fiber mode; a sequentially positioned elongated and substantially untapered region of a substantially uniform diameter along its length, that is preferably surrounded by a medium that substantially matches the refractive index of a fiber cladding in the untapered region, and that passes only at least one supported fiber mode, while removing substantially all other fiber modes; and a second taper region tapering up from the uniform diameter of the untapered region to a higher diameter at its end which is sized to at least approximately match a cladding diameter of a cladding of single mode optical fiber, and that is configured to achieve a connection therewith of high ruggedness that maximizes the likelihood that the mode coupling device will remain securely connected to the single mode optical fiber. Preferably, the second taper region is sufficiently short to maintain sufficient substantial coupling between the at least one predetermined mode and the at least one supported mode of the device.

In alternate embodiments of the optical fiber mode coupling device of the present invention, the inventive optical fiber mode coupling device includes an in-line polarizing component in one of its regions that provides the mode coupling device with superior mode filtering and/or conditioning performance by only allowing fiber modes of a specific polarization to pass therethrough and removing other fiber modes of a different polarization, thereby increasing the effectiveness of utilization of the optical fiber mode coupling device as a mode filter.

Referring now to FIG. 1A, a first exemplary embodiment of the inventive optical fiber mode coupling device 10 is shown as being positioned between a multimode fiber (MMF) 12, supporting at least one desired mode and at least one undesired mode, at one of its ends (at position A), and a single mode fiber (SMF) 16, supporting at least one predetermined mode, at its other end (at position D). The mode coupling device 10 includes:

a first taper region 22 of a length L2, configured for connection to the MMF 12 multimode optical fiber at its first end (position A), that tapers down, preferably in accordance with a tapering profile 46, from a diameter D2 (at position A) toward its second end (at position B) to a diameter D6, which is preferably sufficiently small to support only the at least one supported fiber mode traveling therethrough. Preferably, the tapering profile 46 is sufficiently smooth, and the length L2 is of sufficient magnitude, to achieve and maximize coupling between the at least one desired fiber mode of the MMF 12, and the at least one supported fiber mode. In a preferred embodiment of the present invention, the first taper region 22 may be fabricated from an optical fiber having substantially similar properties to the MMF 12.

an elongated and substantially untapered region 24, that passes only at least one supported mode, while removing substantially all other modes. By way of example, the untapered region 24: (a) may be of a substantially uniform diameter D6 along its length L3; and/or (b) may be bent and/or twisted at least once along its length, and/or (c) may comprise one or more types of surface deformation(s) that assist its mode removal capabilities. This untapered elongated region 24 is preferably surrounded by a medium 40, that substantially matches the refractive index of fiber cladding 20c in the untapered elongated region 24. A smaller index contrast between the fiber cladding 20c and medium 40 refractive indices is advantageous, because lowering the index contrast, by selecting an appropriate medium, results in a corresponding reduction of the minimum length L3 of the untapered elongated region that is required to achieve the needed removal of unsupported modes; and a second taper region 26 tapering up, optionally in accordance with a taper profile 48, from the uniform diameter D6 of the untapered region 24 to a higher cladding 20d diameter D8 at its end (at position D), which is sized to approximately match a cladding 42 diameter D4 of the SMF 16, and that is configured to achieve a connection therewith of sufficient ruggedness to maximize the likelihood that the mode coupling device 10 will remain securely connected to the SMF 16. Preferably, the second taper region 26 is of sufficiently short length L4 to achieve sufficient coupling between said at least one supported mode of the device 10, and the at least one predetermined mode of the SMF 16.

In alternate embodiments of the invention, the mode coupling device 10 may be configured as a "pigtailed" mode coupling device 14 which includes a length L6 of the MMF 12 integral with the first taper region 22 (at position A). The length L6 is preferably selected in accordance with the desired application of the mode coupling device 14. In another embodiment of the present invention, the second taper region 26 may include a short substantially uniform region 30 after position D, but before the end of the SMF 16, that improves the rigidity of the larger diameter D8 second taper region 26 end, thereby improving its connection with the SMF 16.

The inventive mode coupling device 10 may be advantageously fabricated by utilizing the optical fiber assembly fabrication techniques disclosed in the commonly assigned co-pending U.S. patent application Ser. No.: 11/544,416 entitled "Method for Fabricating an Optical Fiber Assembly Having Optical Fibers of Different Diameters", filed Oct. 6, 2006, which is hereby incorporated by reference herein in its entirety. In summary, a multimode fiber may be pre-spliced to a single mode fiber, and a portion of the multimode fiber proximal to the connection interface with the single mode fiber may then be drawn and otherwise processed to produce the first tapered region, the substantially untapered region, and the second tapered region. Of course, other optical fiber device fabrication techniques may also be readily utilized.

drawing a multimode fiber to produce at least the first taper region 24

Thus, as described above, by way of example, during operation of the mode coupling device 10 of the present invention as a mode filter, the multimode signal 30a, having at least one desired fiber mode, and at least one undesired fiber mode, entering the device 10 at position A, is advantageously filtered by the device 10, so that a filtered signal 32a comprising at least one predetermined fiber mode (corresponding to the at least one desired fiber mode of the signal 30a), exits the device 10. In another example, during operation of the mode coupling device 10 of the present invention as a mode conditioner, the signal 30b comprising at least one predetermined fiber mode, entering the device 10, is advantageously conditioned by the device 10 (e.g., optimized for transmission through a MMF), so that a conditioned signal 32b, comprising at least one desired fiber mode (corresponding to a conditioned at least one predetermined fiber mode of the signal 30b), exits the device 10 at position A. By way of example, "conditioning" a signal may include, but is not limited to: expanding its mode field diameter, modifying its mode field profile, etc.

Referring now to FIGS. 2A to 2D, a number of exemplary tapering profiles 50a to 50d are shown by way of example, and may be implemented as alternate embodiments of one, or of both of the taper profiles 46, 48 of FIG. 1A.

Referring now to FIGS. 3A to 3C, in alternate embodiments of the optical fiber mode coupling device of the present invention, the novel optical fiber mode coupling device includes an in-line polarizing component positioned in one of its regions, that provides the mode coupling device with superior mode filtering and/or conditioning performance by only allowing fiber modes of a specific polarization to pass therethrough and removing other fiber modes of a different polarization, thereby increasing the effectiveness of utilization of the optical fiber mode coupling device as a mode filter.

Referring now to FIG. 3A, a first alternate embodiment of the inventive mode coupling device is shown as a mode coupling device 100a, which may be connected to a MMF 104a on one end (at position A1), and to a SMF 106a at the other end (at position E1). The mode coupling device 100a preferably includes a first tapered region 108a, followed an elongated substantially untapered region 110a, and then followed by a polarizing component 112a, positioned before the second tapered region 114a. During operation of the mode coupling device 100a, in which the polarizing component 112a is configured to only permit polarizations "a1" to pass, a signal 150, having components 150a1 and 150b of different polarizations, enters the device 100a, which then produces a filtered signal 150a2 at position E1, matching the polarization of at least one predefined fiber mode (corresponding to at least one desired fiber mode of the signal 150).

Referring now to FIG. 3B, a second alternate embodiment of the inventive mode coupling device is shown as a mode coupling device 100b, which operates similarly to the device 100a above, but which differs in that its polarization component 112b is positioned between a first tapered region 108b, and the elongated substantially untapered region 110b.

Referring now to FIG. 3C, a third alternate embodiment of the inventive mode coupling device is shown as a mode coupling device 100c, which may be connected to a MMF 104c on one end (at position A3), and to a SMF 106c at the other end (at position D3). The mode coupling device 100c preferably includes a first tapered region 108c, followed by an elongated substantially untapered polarizing component 112c, positioned before the second tapered region 114c. Optionally, the polarizing component 112c may comprise one or more types of surface deformation(s), and/or one or more additional modifications that assist its mode removal capabilities. During operation of the mode coupling device 100c, in which the polarizing component 112c is configured to only permit polarizations "c2" to pass, a signal 150, having components 150c1 and 150d of different polarizations, enters the device 100c, which then produces a filtered signal 150c2 at position D3, matching the polarization of at least one predefined fiber mode (corresponding to at least one desired fiber mode of the signal 150).

Referring now to FIG. 3D, a fourth alternate embodiment of the inventive mode coupling device is shown as a mode coupling device 100d, which may be connected to a MMF 104d on one end (at position A4), and to a SMF 106d at the other end (at position G4). The mode coupling device 100d preferably includes a complete mode coupling device 120d (for example such as the mode coupling device 10 of FIG. 1A), followed by a polarization device 112d which itself includes tapered regions 122d,126d with a polarization component 124d positioned therebetween. The mode coupling device 100d other wise operates similarly to the above-described mode coupling device 100a of FIG. 3A.

Figure 1B:
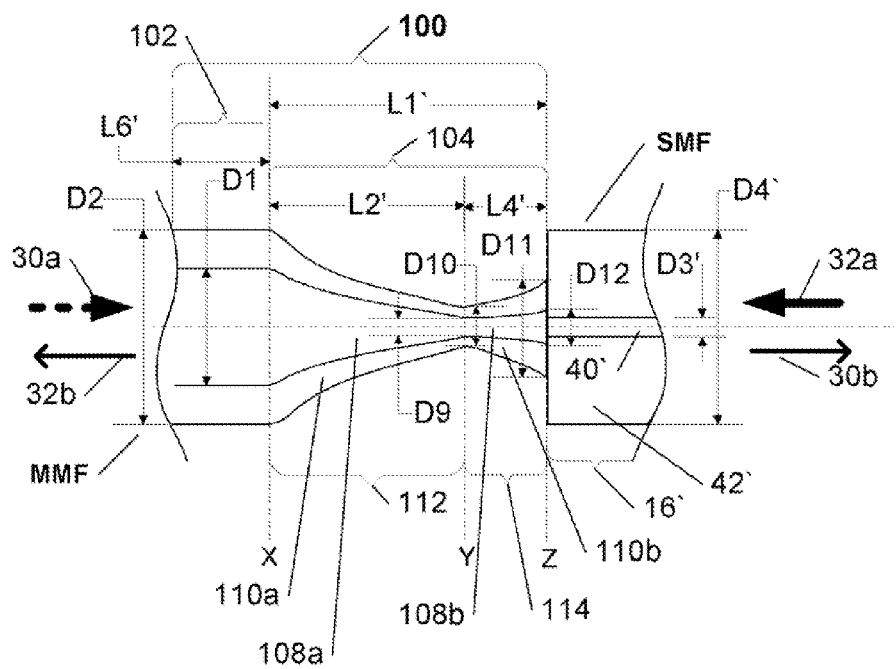
FIG. 1B (Prior Art) is a schematic diagram of a side view of an exemplary prior art optical fiber mode filter device.
Figure 2A:
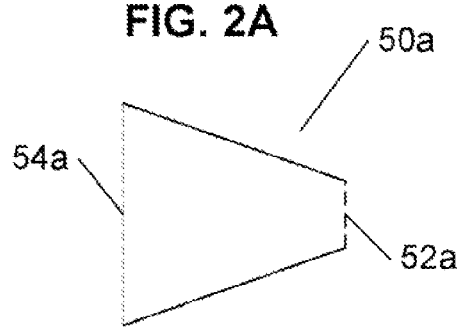
FIGS. 2A-2D are schematic side view diagrams of various exemplary embodiments of taper profiles of tapered regions of the inventive optical fiber mode coupling device of FIG. 1A.
Figure 2B:
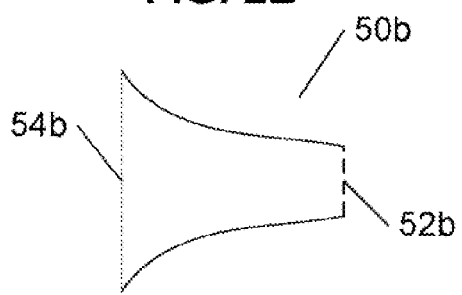
Figure 2C:
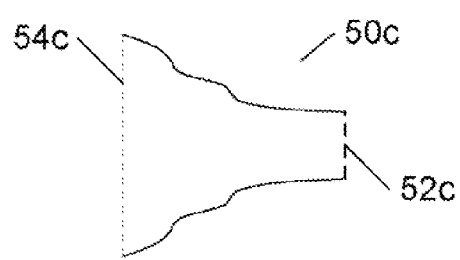
Figure 2D:
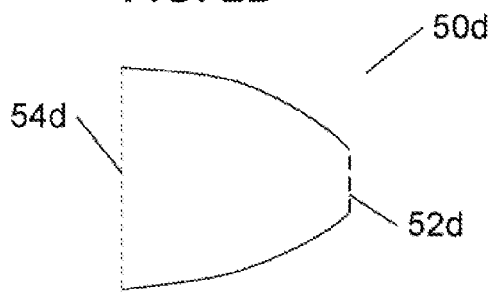

As noted above, in connection with FIG. 1, any of the embodiments of the inventive mode coupling devices of FIGS. 3A-3D may likewise be advantageously fabricated utilizing the optical fiber assembly fabrication techniques disclosed in the above-incorporated '416 application, by pre-splicing a first multimode fiber, an optical fiber device preform that is suitable for fabrication of a chiral fiber polarizing component therefrom, a second multimode fiber, and a single mode fiber. In summary, the first and second multimode fibers may be drawn and otherwise processed to produce to produce the first tapered region, the substantially untapered region, and the second tapered region, while the optical fiber device preform is processed (e.g., by twisting, etc.) to produce the desired polarizing component therefrom. Of course, other optical fiber device fabrication techniques may also be readily utilized.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the Claims appended hereto.

We claim:

1. An optical fiber mode coupling device, having a first end supporting at least one desired fiber mode and a least one undesired fiber mode, and second end supporting at least one predetermined fiber mode, operable to maximize coupling between the at least one predetermined, fiber mode and the at least one desired mode, when positioned between a first optical fiber connected to the first end and a second optical fiber connected to the second end, further comprising:

a first optical fiber mode coupling section comprising a first fiber core operable to support at least two spatial fiber modes, and having a third end, corresponding to the first end, configured for connection to the first fiber, and a fourth end having at least one supported mode, and being operable to achieve sufficiently strong coupling, between only at least one said desired mode and said at least one supported mode;

a second optical fiber mode coupling section comprising a second fiber core operable to support at least one spatial fiber mode, and longitudinally and sequentially positioned after said first mode coupling section, having a fifth end corresponding to said fourth end, and an opposing sixth end, and being operable to substantially only allow said at least one supported mode to pass therethrough, while substantially removing all not supported fiber modes; and a third optical fiber mode coupling section comprising a third fiber core operable to support at least one spatial fiber mode, and longitudinally and sequentially positioned after said second mode coupling section, having a seventh end corresponding to said sixth end, and an opposing eighth end, corresponding to the second end, configured for connection with the second fiber of sufficiently high predetermined ruggedness, and being operable to achieve coupling, at said seventh end, between at least one supported fiber mode and the at least one predetermined mode.

2. The optical fiber mode coupling device of claim 1, wherein said first optical fiber mode coupling section further comprises a first elongated optical fiber structure of a first length, comprising a first taper region tapering, in accordance with a first predetermined taper profile, from a first diameter at said third end, sized to at least approximately match a diameter of the first optical fiber, down to a second diameter at said fourth end, said second diameter being sufficiently small, to substantially only support the at least one supported mode, wherein said first predetermined taper profile is sufficiently smooth, and said first length is of sufficient magnitude, to achieve desired coupling between the at least one desired fiber mode and said at least one supported fiber mode.

3. The optical fiber mode coupling device of claim 1, wherein said second optical fiber mode coupling section further comprises a second elongated optical fiber structure of a second length and being substantially untapered along said second length, said second length being of a sufficient magnitude, such that said untapered second optical fiber structure passes the at least one predetermined fiber mode, while removing substantially all other fiber modes therefrom.

4. The optical fiber mode coupling device of claim 1, wherein said third optical fiber mode coupling section further comprises a third elongated optical fiber structure of a third length, comprising a second taper region tapering, in accordance with a second predetermined taper profile, from said second diameter at said seventh end, up to a third diameter at said eighth end, sized to at least approximately match a diameter of the second optical fiber to thus achieve a connection of sufficiently high ruggedness therewith, said second diameter being sufficiently small, to substantially only support the at least one supported mode, wherein said third length is sufficiently Short to maintain sufficient substantial coupling between the at least one predetermined mode and the at least one supported mode.

5. The optical fiber mode coupling device of claim 1, further comprising:

a polarizing component, positioned after said fourth end, but before the second fiber, operable to only allow fiber modes of a specific polarization to pass the and to remove other fiber modes of a different polarization, thereby increasing the effectiveness of the optical fiber mode coupling device.

6. The optical fiber mode coupling device of claim 5, wherein said polarizer component is positioned longitudinally between said first mode coupling section and said second mode coupling section.

7. The optical fiber mode coupling device of claim 5, wherein said polarizer component is positioned longitudinally between said second mode coupling section and said third mode coupling section.

8. The optical fiber mode coupling device of claim 5, wherein said polarizer component is positioned longitudinally between said third mode coupling section and the second optical fiber.

9. The optical fiber mode coupling device of claim 3, wherein said untapered second optical fiber structure is configured to comprise polarization properties, such that said untapered second optical fiber structure is further operable to only allow fiber modes of a specific polarization to pass therethrough and to remove other fiber modes of a different polarization, thereby increasing the effectiveness of the optical fiber mode coupling device.

10. The optical fiber mode coupling device of claim 4, Wherein said second elongated optical fiber structure comprises a cladding having a first refractive index, and further comprises a medium, surrounding said cladding and having a second refractive index, wherein, second length is of sufficient magnitude, at each particular index contrast value comprising a difference between said first refractive index and said second refractive index, to achieve removal of substantially all unsupported fiber modes from a signal passing therethrough.

11. The optical fiber mode coupling device of claim 10, wherein at least one of said cladding and said medium are selected to minimize said index contrast value between the refractive indices thereof.

12. The optical fiber mode coupling device of claim 1, further comprising at least one of:

a multimode optical fiber, of a fourth length, having a ninth end securely attached to said third end of said first optical fiber mode coupling section, and an tenth end substantially sized and configured for secure and reliable attachment to the first optical fiber end; and/or a single mode optical fiber, of a fifth length, having a ninth end securely attached to said eighth end of said third optical fiber mode coupling section, and a tenth end, substantially sized and configured for secure, rugged, and reliable attachment to the second optical fiber end.

* * * * *